SIGNALING SYSTEM FOR CARRIER TELEPHONE TRANSMISSION

Filed July 26, 1950

2 Sheets-Sheet 1

INVENTORS: F. S. ENTZ
G. A. PULLIS
R. E. RESSLER
R. O. SOFFEL
L. A. WEBER
BY H. A. Burgess
ATTORNEY

SIGNALING SYSTEM FOR CARRIER TELEPHONE TRANSMISSION

Filed July 26, 1950 2 Sheets-Sheet 2

INVENTORS: F. S. ENTZ
G. A. PULLIS
R. E. RESSLER
R. O. SOFFEL
L. A. WEBER

BY H. A. Burgess
ATTORNEY

Patented May 4, 1954 2,677,726

UNITED STATES PATENT OFFICE 2,677,726

SIGNALING SYSTEM FOR CARRIER TELEPHONE TRANSMISSION

Ferdinand S. Entz, Mount Kisco, and George A. Pullis, Riverdale, N. Y., Ralph E. Ressler, Morristown, N. J., Robert O. Soffel, Hastings-on-Hudson, N. Y., and Laurance A. Weber, East Orange, N. J., assignors to Bell Telephone Laboratories, Incorporated, New York, N. Y., a corporation of New York Application July 26, 1950, Serial No. 175,898

8 Claims. (Cl. 179—15)

This invention relates to signaling systems, and particularly to such systems adapted for carrier telephone transmission.

An object of the invention is to increase the reliability of signaling systems utilized in carrier telephone transmission and to prevent their false operation by speech and noise currents.

A feature of the invention is a signal receiver responsive to signaling frequencies located outside the speech band, wherein the signals are converted into square waves of constant amplitude of unchanged frequency to render the receiver unresponsive to noise and the like.

Another feature of the invention is a signal receiver responsive to signaling frequencies located outside the speech band, wherein the signals are converted at the same frequency to pulses of constant amplitude, and wherein a direct-current amplifier whose bias is changed by a signal responsive relay minimizes first pulse distortion.

In accordance with the present invention, a signaling circuit has been provided integrated with a multichannel carrier telephone system which it serves and characterized by improved operation and enhanced insurance against false operation by speech or other interfering currents such as noise and the like. The signaling circuit as specifically disclosed herein utilizes a signaling tone of 3700 cycles produced by an oscillator, the tone frequency being outside the actual speech band for example, of 300–3100 cycles. The tone frequency and speech band are both modulated with a common carrier frequency before transmission over the line and are then separated at the far end by filters into separate channels, whence they are detected by receivers.

The 3700-cycle signaling tone is continuously transmitted in both directions during the idle periods, when the subscriber's telephones are in the On-Hook condition. An Off-Hook condition at the subscriber's telephone set is characterized by the absence of tone from the line. Accordingly, when the signaling circuit is seized by the trunk equipment at either end, the 3700-cycle signaling tone is removed in the direction from the seized to the called end.

The receiver at the far end of the line translates the On- or Off-Hook condition represented by the presence or absence of 3700-cycle tone to a corresponding direct-current condition for connection to the receiving trunk equipment.

The circuit as a whole gives an enhanced measure of protection against line transients and is remarkably free from false operation.

The signaling circuit disclosed herein is particularly applicable to a short haul multichannel carrier telephone transmission system such as is disclosed in the United States application of R. S. Caruthers, Serial No. 176,036, filed July 26, 1950.

Referring to the figures of the drawing:

Figs. 1A and 1B are block diagrams, which disclose a two-way carrier telephone system primarily displaying the inter-relationship between the tone signaling and voice frequency circuits. The specific values mentioned in the description and the details shown and described are to be taken as illustrative of one form of embodiment and not as limiting.

Figures 1A, 1B, 1C:
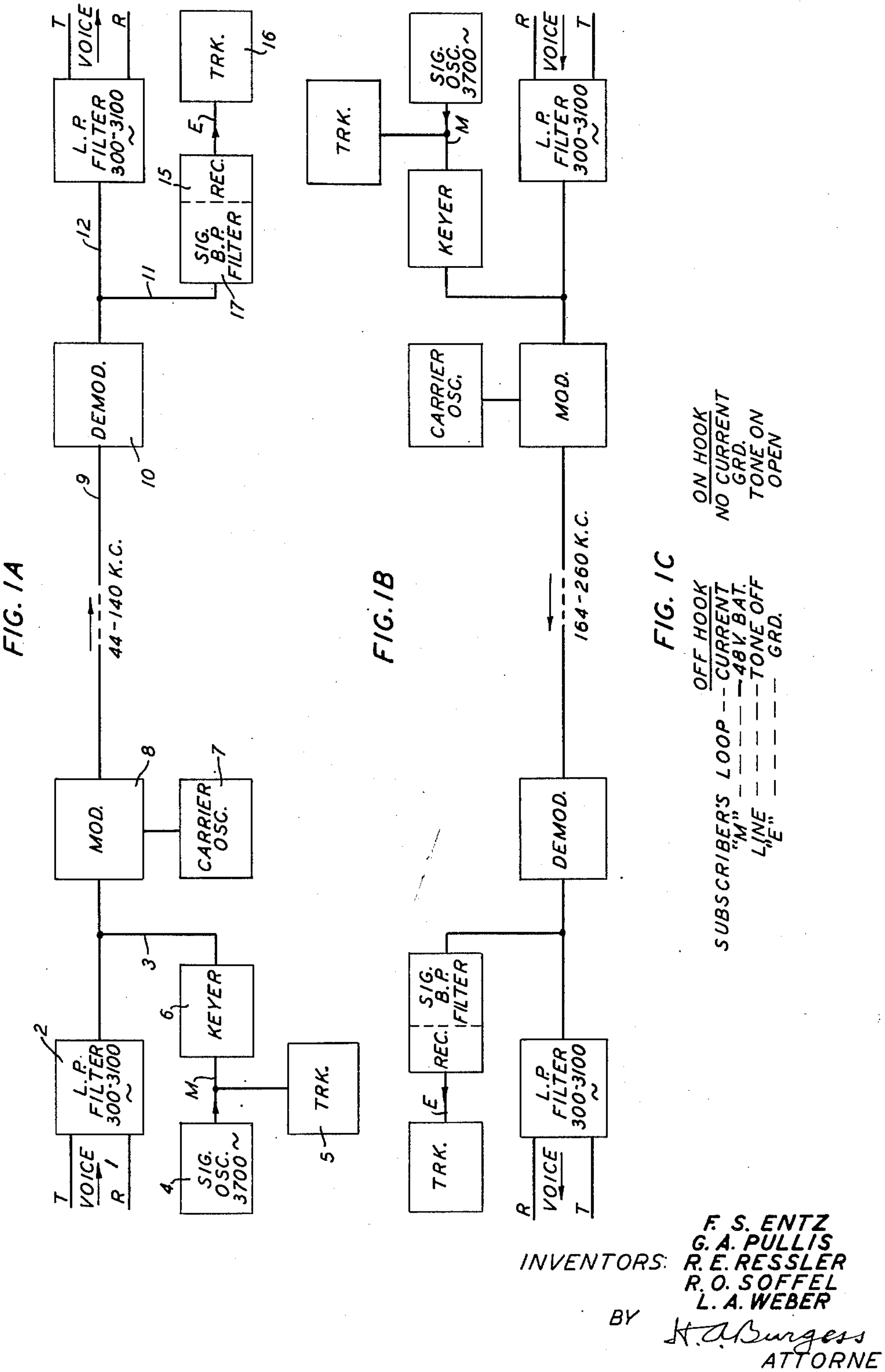
Figs. 1A and 1B are block diagrams of a two-way carrier telephone system utilizing the signaling circuit of the invention.
Fig. 1C is a tabulation of situations corresponding to "Off Hook" and "On Hook" conditions.

The voice frequencies, which are derived from the subscriber's set (not shown) come in over line 1, pass through a low-pass filter 2, which defines a speech band between 300 and 3100 cycles.

The signaling tone is generated in the signaling branch 3 by signal tone oscillator 4 under the control of lead M, which is connected to trunk circuit 5.

Both the signaling tone and the 300–3100-cycle speech band are modulated at the modulator 8 with a carrier frequency from carrier oscillator 7 in the range of 48–136 kilocycles, and the modulated frequencies are transmitted over line 9 to a distant station, where they are demodulated by demodulator 10 and separated into a voice frequency channel 12 and a signaling frequency channel 11. Twelve carrier channels of 8-kilocycle band width each are utilized. The transmission of telephone conversations in each channel is by conventional double sideband technique.

The signaling circuit functions through the transmission of 3700-cycle tone over the line 9 by a carrier wave and its reception in receiver 15. Signaling tone On corresponds to an On Hook signal and signaling tone Off corresponds to an Off Hook signal. In the idle circuit condition with On Hook signals from both ends of the line, 3700 cycles is transmitted in both directions on the carrier channel as shown in Figs. 1A and 1B. During the talking interval with Off Hook signals from both ends of the line, 3700 cycles is off in both directions of the carrier channel.

The keyer 6 translates ground and —48 volt battery on the "M" lead from the trunk equipment 5, corresponding respectively to On Hook and Off Hook into tone On and tone Off the carrier channel, 9. At the distant end of the line 1, these tone On and tone Off conditions are translated by the signal receiving circuit 17, 15 to ground opens and closures, respectively, over the "E" lead to the associated receiving trunk equipment 16. The specific receiving circuit shown in Figs. 3 and 4 makes this translation.

When the subscriber's set is On-Hook or in the idle condition, the "M" lead is grounded and the keyer 6 allows 3700-cycle tone to be transmitted.

When the subscriber's set is in the Off-Hook condition, the "M" lead is connected to (—) negative battery and 3700 cycles are not transmitted.

The carrier telephone transmission in the opposite direction is indicated in Fig. 1B. The circuit arrangement is essentially similar to that previously described for Fig. 1 except that the twelve carrier channels are located between 168–256 kilocycles.

*Oscillator and keyer*

Figures 2, 3, 4:
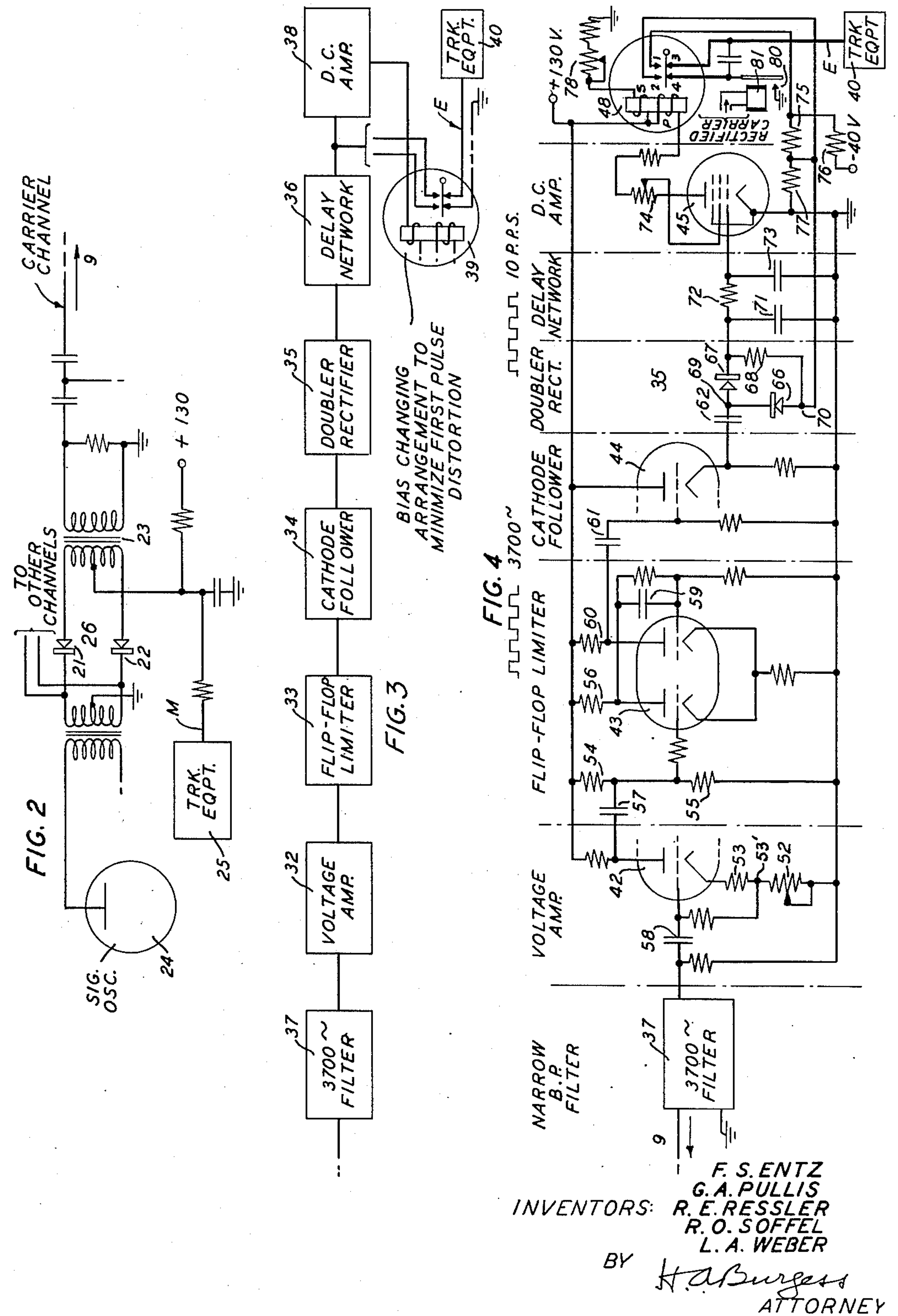
Fig. 2 is a schematic circuit diagram of the tone signal transmitter circuit.
Fig. 3 is a block diagram of the receiver.
Fig. 4 is a circuit showing the receiving circuit in combination with the carrier transmission line.

Fig. 2 shows the detailed circuit arrangement of oscillator and keyer described in connection with Fig. 1A.

The 3700-cycle oscillator 24 is of the R-C type shown in the United States Patent 2,268,872, issued January 6, 1942 to W. R. Hewlett, but any other suitable audio oscillator may be used. The keyer 26 is an arrangement of suitably poled germanium varistors 21 and 22 whose impedance value, namely, high or low, is controlled by a voltage bias. Thus in Fig. 2, a ground on the "M" lead derived from the trunk circuit 25 causes a positive voltage to be applied to the center of repeating coil 23 from the +130-volt source. This causes current to flow in the forward direction of the germanium varistors 21 and 22 aforementioned and back to ground through the output transformer of the 3700-cycle oscillator 24. With current flowing in this direction through the varistors, a low impedance path is established for the 3700-cycle tone from the oscillator output to the input of the carrier channel, 9. The tone is transmitted over the carrier channel when this low impedance path is established.

The Off-Hook or seizure condition is indicated by tone being removed from the channel circuit by replacing ground on the "M" lead from the trunk circuit 25 with —48 volt battery (not shown). When the "M" lead is thus connected to negative battery, the center tap of repeating coil 23 is placed at a negative potential with respect to ground. This negative voltage causes a very small current to flow in the reverse direction through the varistors 21 and 22, and to ground through the output transformer of the oscillator. With current thus flowing in the reverse direction through the varistors, a high impedance circuit is established between the oscillator output and the carrier channel input. This effectively removes the tone from the carrier channel and sends an Off Hook signal over the line.

*Receiving circuit*

At the distant end of the line, the 3700-cycle tone signal is separated from the voice currents as indicated schematically in Fig. 1A. The block diagram of Fig. 3 shows the essential components of the signal receiving circuit.

Referring to the block diagram of Fig. 3, the receiving circuit shown therein consists of a very narrow band-pass filter 37 tuned to the signaling frequency (3700 cycles), a voltage amplifier stage 32, a direct-current flip-flop multivibrator type amplitude limiter 33, a cathode-follower impedance transformer 34, a voltage doubler rectifier circuit 35, an interstage delay network 36, a direct-current voltage amplifier 38, and a double wound polar relay 39 of the mercury contact type.

Fig. 4 shows the receiving circuit in detail.

Signal tone is separated from the voice currents by the filter 37, which is designed to pass a narrow band of frequencies centered about 3700 cycles. This filter discriminates against broadband noise frequencies (including speech components) and passes freely the signaling tone. The output of the filter 37 is coupled to the grid of the voltage amplifier tube 42 through coupling condenser 58.

The voltage amplifier stage increases the voltage level of the 3700-cycle signaling tone so that positive action of the limiter is assured under all conditions. The grid of the amplifier tube 42 is returned to a fixed connection point 53' between potentiometer 52 and resistor 53 in the cathode circuit so that the direct-current grid bias is determined by the current flowing through resistor 53. The potentiometer 52 controls the amount of negative feedback introduced in this stage and thereby controls the over-all gain of the stage. The alternating-current drop across potentiometer 52 may be thought of as a small generator in series opposing with the output voltage of the filter 37. If the potentiometer resistance is zero, the full filter output voltage will be available for driving the grid of the tube 42. As more and more resistance is included in the cathode circuit by increasing the gain control, less and less of the output of the filter is effective in driving the grid, due to the subtractive effect of the voltage across potentiometer 52. The output of tube 42 is coupled through condenser 57 to the amplitude limiter or flip-flop multivibrator 43.

The flip-flop limiter 43 is a direct-current multivibrator in the form of a double triode tube having positive feedback to give limiting action. It gives a 3700-cycle square wave output of constant amplitude in response to an input sine wave of the 3700 cycles of variable amplitude. The characteristics of this limiter are such that for input amplitudes below a certain threshold value, no output is obtained. Above this threshold level, however, a constant amplitude 3700-cycle square wave is obtained. The necessary input level change to go from the zero output condition to essentially constant amplitude output is in the order of .3 decibel. In the quiescent condition with no input to the multivibrator 43, the input triode section thereof is biased below cut-off as a result of the potentials existing on the grid and cathode of this section. Grid voltage is determined by the voltage divider action of resistors 54 and 55 in the grid circuit and the cathode voltage is determined by the flow of current in the other half of the tube. These values are apportioned so that the input triode section is normally cut off.

When an input sine wave is applied to the grid of the input triode section of the multivibrator 43, a point is reached (if the amplitude of the input wave is above the threshold value for the circuit) where the grid of this section is driven above cut-off. When this occurs, the input section of the tube begins to draw plate current. This decreases the voltage at the plate side of resistance 56 as a result of the voltage drop in this resistance. This negative wave front is coupled directly to the grid of the second half of the multivibrator through condenser 59. This negative excursion of grid voltage cuts the output section of the multivibrator off. With the second tube driven to cut-off, the voltage at the plate side of resistance immediately rises to +130 volts and remains there.

As the input voltage remains positive and above the threshold voltage, the conditions of the two triodes will remain as above, i. e., input section conducting and output section cut off. When the input voltage falls below the threshold value, the input section of the tube will cut off resulting in a rapid rise of voltage at its plate. This rapid rise of plate voltage causes conduction in the output section of the tube 43. When this output triode conducts, its plate voltage drops to a low value and conditions are again restored to those obtaining at the beginning of the flip-flop cycle. The wave form at the plate of the output triode section of the multivibrator 43 is a square wave whose amplitude is determined solely by the characteristics of the flip-flop limiter stage and not by the amplitude of the incoming 3700-cycle sine wave. This square wave is coupled through condenser 61 to the grid of triode 44 acting as a cathode-follower impedance transformer.

The cathode potential of the cathode-follower tube 44 follows that of the grid of the tube as it is driven by the square wave output of the flip-flop limiter stage. The tube 44 provides no voltage gain but allows the low impedance voltage doubler circuit 35 to be connected to the multivibrator limiter 43 without adverse loading effects. This stage by virtue of the cathode follower action, acts as a high impedance on its grid side and low impedance on its cathode side, transmitting faithfully the input 3700-cycle square wave to the low impedance doubler 35.

The voltage doubling rectifier circuit 35 consists of coupling condenser 62, germanium varistors 66 and 67, and rectifier load resistor 68. The rectifier load resistor 68 is returned to a point of negative potential to provide grid bias for the succeeding amplifier stage 45. The voltage doubler rectifier converts the bursts of 3700-cycle square waves at the output of the cathode-follower to pulses of direct current. These pulses have approximately the same duration as the corresponding dial or switchhook open intervals.

When the square wave at the output of the cathode-follower 44 is in the negative part of its cycle, the junction point 69 of the varistors is at a more negative potential than the junction 70. This causes current to flow in the forward direction in varistor 66 to charge up condenser 62. During the positive half cycle of the square wave at the cathode of the cathode-follower 44, varistor 67 will conduct causing a charge to build up on the load condenser 71. The value of the voltage built up on condenser 71 is a function of the positive half cycle peak voltage and also the voltage which condenser 62 has on it at the end of the negative half cycle. The rectifier load voltage approaches twice the peak value of the square wave. During the negative half of the cycle, the load condenser 71 tends to discharge through resistor 68, but the time constants of the circuit are such that no appreciable discharge is accomplished before the next positive half cycle comes along to replenish the charge. A direct-current voltage, then appears across the load condenser 71 whenever the 3700-cycle tone is received from the carrier channel. This voltage is substantially independent of the amplitude of the incoming signal as long as it is above the threshold value for the circuit.

Condenser 71, resistor 72 and condenser 73 comprise a delay network, the purpose of which is to delay the application of the rectified 3700-cycle tone to the grid of direct-current amplifier tube 45. If the voltage were applied to the tube without this delay, short energy transients which normally occur on the line might cause the circuit to operate falsely. The delay of this network is such that it is necessary to apply tone to the input of the circuit for approximately 15 milliseconds before any output from the circuit is obtained. The time constants of the delay circuit are such that the grid voltage of tube 45 reaches a value above cut-off approximately 15 milliseconds after the beginning of the train of 3700 cycles per second waves at the rectifier input. This causes plate current to flow in tube 45 and operate polar relay 48. Hence a group of input waves shorter than 15 milliseconds duration (such as might be caused by momentary surges on the line) will not cause tube 45 to draw plate current to operate the relay. However, legitimate dial open intervals, about 50–60 milliseconds long, are more than enough to cause relay operation.

The direct-current amplifier tube 45 is a triode-connected pentode. In the absence of incoming tone, it is biased below cutoff so that the current in the secondary winding of polar relay 48 is essentially zero. This causes the relay to be positioned so that its contacts 3 and 4 are connected together by the armature. Since ground is normally supplied over the "G" lead, this results in a ground being applied to the "E" lead which connects to the trunk equipment 40.

When tone is received, the voltage at the grid of the tube 45 is driven slightly positive by the action of the rectifier doubler causing a large plate current to flow in the secondary winding of polar relay 48. The value of this saturation current is adjusted by means of variable resistance 74. When this current flows in the secondary of relay 48, the relay operates closing contacts 1 and 2 and opening up contacts 3 and 4, and hence opening the "E" lead to the associated trunk equipment.

The "E" lead grounded corresponds to a seizure of the circuit from the distant end. The "E" lead open corresponds to an idle condition from the distant end. When contacts 1 and 2 close, resistor 75, in the grid bias voltage divider consisting of resistors 77, 75, 76 is short-circuited causing the grid bias on the direct-current amplifier stage 45 to go more negative. This is done to speed discharge of the delay network condensers 71, 73 during the intervals when the 3700 cycles are removed while dial pulsing. If appreciable charge remains on these condensers, subsequent pulses in a train will have different durations than the first few pulses of the train. Increasing the bias toward which the condensers discharge, causes an increased energy-rate of discharge and hence an increased total voltage discharge for a given length of time.

Pulsing begins after a long off hook so that when the first pulse of 3700 cycles comes along, condensers 71 and 73 are fully charged from bias resistor 75. The 3700-cycle pulse is detected and discharges 71 and 73 so that their voltages are approximately zero. When the first pulse is over, the condensers start to charge with the relay operated and resistor 75 short-circuited. If there is insufficient time for these condensers to charge fully before the next pulse, the condenser voltage curve will start toward zero on the next pulse from a different point and the relay will operate sooner. Thus, first pulse will be shorter then succeeding ones.

A per cent break control 78 in series with a winding of relay 48 is used to adjust the received per cent break when the signaling circuit is receiving dial pulses.

An automatic disconnect circuit 80 in case of received carrier failure is provided in the E lead. This involves a relay 81 which is actuated by the rectified, received carrier wave. It provides an automatic disconnect signal over the "E" leads on all channels.

The ground, which is connected to the trunk circuit over the "E" leads to indicate an off hook signal, is supplied through the contacts of the carrier alarm relay. This relay remains operated as long as the total received carrier is of sufficiently high level. As long as this relay is operated normal signals will be passed to the trunk and switching equipment. If carrier fails, this relay will release leaving the "E" lead open which prevents false permanent seizure signals toward the switching equipment. If carrier fails during a conversation the relay releases sending disconnects (on hook) signals. This is necessary to prevent the called subscriber from being kept unable to release the connection and also unable to signal any operator. The carrier alarm relay is slow in releasing so that short carrier failures will not drop existing connections.

What is claimed is:

1. A signaling system for carrier telephone comprising a transmission line for carrier frequencies, a transmitting station connected thereto comprising a source of speech frequencies, a filter for passing the speech band, an oscillator providing a signal frequency outside the upper limit of said speech band connected to the output of said speech filter, a varistor keyer connected to said signal oscillator for providing "On" and "Off" signals, a common modulator for said speech and signal frequencies connected to said line, a receiving station connected to said line at a distant point comprising a pair of filters connected in parallel, one constituting a speech band filter and the other constituting a signal frequency filter, and a constant amplitude receiver connected to said signal frequency filter for detecting said signal.

2. A multichannel carrier system comprising a transmission line, a transmitter comprising a source of voice signals and a signaling oscillator connected thereto in parallel to each other at one point thereof, a varistor keyer connected to said signaling oscillator to provide tone "On" and "Off" signals, a trunk circuit and control lead connected to said keyer, means for modulating said speech band and signal concurrently on a common carrier frequency for transmission over said line, a receiving station connected to said line at a distant point comprising a carrier demodulator, means for segregating said voice band and signal tone into separate channels, a constant amplitude limiter circuit connected to said signal channel, and a trunk circuit connected thereto.

3. The structure of claim 2, wherein said signal receiving channel comprises a rectifier, direct-current amplifier, and a polarized relay connected to said limiter circuit in sequence.

4. The structure of claim 2, wherein said limiter circuit comprises a multivibrator for converting the signaling wave into a square topped wave of equal frequency.

5. A signaling circuit for carrier wave transmission comprising a channel having a source of voice frequencies therein, a parallel channel thereto having a signal oscillator therein for generating sinusoidal waves at frequencies above said voice band, means for keying said oscillator under the control of a trunk circuit providing direct-current potentials, a modulator connected to the otuput of said channels for modulating said voice frequencies and signal on a common carrier, a carrier transmission medium connected to said modulator, a demodulator connected to said medium at a distant point, parallel filters connected to said demodulator for segregating said signals from said voice frequencies into separate channels, a multivibrator limiter connected to said signaling channel for constant amplitude limiting of the received signal, a rectifier connected thereto and a polarized relay actuated by said rectified current to apply direct-current control potentials to an outgoing trunk circuit.

6. A two-way carrier system comprising a source of speech currents, a signaling tone oscillator connected in parallel thereto, said tone being above said speech band, a modulator connected thereto for modulating said tone and speech band on a common carrier frequency, a transmission line connected to said modulator for transmitting said modulated tones thereover in opposite directions during idle subscriber periods, means located at a distant point on said line for separating said modulated signal and speech band into separate channels, means connected to a subscriber's trunk circuit for removing said modulated signal from said line, a constant amplitude limiter connected to the signaling channel for providing pulses corresponding to the signal tone, a rectifier and a polarized relay for translating said pulses into ground open and closures on a trunk circuit.

7. A signaling circuit for carrier systems comprising a sinusoidal signal tone oscillator, a varistor keyer connected to the output of said oscillator, means for biasing said keyer to high and low impedances, respectively, under the control of potentials derived from a trunking circuit, a modulator connected to said oscillator for modulating said tone on a carrier frequency, a transmission line connected to said modulator, a demodulator and signal receiving circuit connected to said line at a distant point, said receiving circuit comprising a narrow band signal filter, a multivibrator amplitude limiter connected to said filter for converting said signaling wave into a square topped wave of equal frequency, a rectifier connected to said multivibrator, a polarized relay connected to said rectifier, and means controlled by said relay adapted to minimize first pulse distortion.

8. The structure of claim 7, wherein a delay network and direct-current amplifier are connected between said rectifier and polarized relay to prevent false operation by undesired speech and noise currents.

References Cited in the file of this patent

UNITED STATES PATENTS

| Number | Name | Date |
|---|---|---|
| 2,300,415 | Green | Nov. 3, 1942 |
| 2,392,672 | Koch | Jan. 8, 1946 |
| 2,414,795 | Brandt | Jan. 28, 1947 |